(12) United States Patent
Miyanaga

(10) Patent No.: US 9,017,199 B2
(45) Date of Patent: Apr. 28, 2015

(54) SILENT CHAIN TRANSMISSION SYSTEM

(75) Inventor: Shouta Miyanaga, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 524 days.

(21) Appl. No.: 13/363,491

(22) Filed: Feb. 1, 2012

(65) Prior Publication Data

US 2012/0196712 A1    Aug. 2, 2012

(30) Foreign Application Priority Data

Feb. 1, 2011    (JP) ................................. 2011-019814

(51) Int. Cl.
*F16G 13/04*    (2006.01)

(52) U.S. Cl.
CPC ..................... *F16G 13/04* (2013.01)

(58) Field of Classification Search
CPC ......... F16G 13/04; F16G 13/06; F16G 13/02; F16H 7/06
USPC ................................ 474/213, 214
See application file for complete search history.

(56) References Cited

U.S. PATENT DOCUMENTS

| | | | | |
|---|---|---|---|---|
| 6,112,510 | A * | 9/2000 | Ichikawa et al. ..................... 59/5 |
| 6,325,735 | B1 * | 12/2001 | Kanehira et al. ............. 474/212 |
| 6,663,522 | B2 * | 12/2003 | Horie ............................ 474/212 |
| 8,668,609 | B2 * | 3/2014 | Young ........................... 474/157 |
| 8,672,786 | B2 * | 3/2014 | Young et al. ................... 474/206 |
| 2003/0125146 | A1 * | 7/2003 | Saitoh .......................... 474/212 |
| 2010/0069187 | A1 * | 3/2010 | Young et al. .................. 474/157 |
| 2012/0165144 | A1 * | 6/2012 | Dogimont et al. ............ 474/212 |
| 2013/0059691 | A1 * | 3/2013 | Miyanaga ..................... 474/214 |

FOREIGN PATENT DOCUMENTS

| | | |
|---|---|---|
| EP | 2416034 A1 | 2/2012 |
| JP | 2001-3995 A | 1/2009 |
| WO | 2010086049 A1 | 12/2009 |
| WO | 2010113790 A1 | 3/2010 |

OTHER PUBLICATIONS

Unpublished U.S. Appl. No. 13/596,157 for Silent Chain.

* cited by examiner

*Primary Examiner* — William E Dondero
*Assistant Examiner* — Mark K Buse
(74) *Attorney, Agent, or Firm* — Howson & Howson LLP

(57) ABSTRACT

In a silent chain transmission, noise performance is improved by preventing guide plates of a silent chain from contacting sprocket teeth before the link plates of the chain contact the sprocket teeth. The silent chain transmission comprises a silent chain in engagement with a sprocket. The silent chain comprises guide rows, each having a pair of guide plates and a plurality of middle link plates, and non-guide rows, each having a plurality of inner link plates. An engagement starting point of the middle link plate with a sprocket tooth and an engagement starting point of the inner link plate with the sprocket tooth are set at positions such that the guide plate is prevented from contacting the sprocket tooth before the respective link plates start to engage the sprocket tooth when runout of the chain in the direction of its width occurs.

1 Claim, 5 Drawing Sheets

SILENT CHAIN TRANSMISSION SYSTEM

FIELD OF THE INVENTION

The present invention relates to a silent chain transmission system comprising a silent chain having guide plates and sprockets with which the silent chain engages. The silent chain transmission system is for use in automobiles, e.g., a timing chain system of an internal combustion engine, industrial machines and the like.

BACKGROUND ART

Among the silent chain transmission systems having a silent chain and sprockets, there has been known one in which the silent chain has guide rows each having a pair of guide plates and middle link plates disposed between the pair of guide plates, non-guide rows each having a plurality of inner link plates and pairs of link pins each provided through the pair of guide plates, wherein the guide rows and the non-guide rows are in mesh alternately in a chain traveling direction by being linked by the pairs of link pins (see Patent Document 1 for example).

PRIOR ART DOCUMENT

Patent Document

[Patent Document 1] Japanese Patent No. 3054144

SUMMARY OF THE INVENTION

Problems to be Solved by the Invention

When the silent chain transmission system is in operation, a traveling state of the silent chain changes variously and there is a case when the silent chain causes runout in a chain width direction (referred to as "transverse-runout" hereinafter) for example.

Then, as shown in FIG. 5, when the silent chain 01 has guide rows 02 each having a pair of guide plates 03 and a plurality of middle link plates 04, non-guide rows 05 having a plurality of inner link plates 06 and pairs of link pins 07 each provided through the pair of guide plates 03 and when the guide row 02 starts to engage with a driving sprocket 08, there is a case when the guide plate 03 contacts with the sprocket tooth 09 before the middle link plate 04 contacts with the sprocket tooth 09 when the transverse runout described above occurs when an inner end surface 03a of an inner outline face of the guide plate 03 is located in a vicinity of an engagement starting point 04p with the sprocket tooth 09 on an inner-flank surface 04a of the middle link plate 04.

Further, as shown in FIG. 6, when an inner side end surface 03b of the inner outline face of the guide plate projects toward the sprocket tooth 09 more than the engagement starting point 06p with the sprocket tooth 09 on an inner-flank surface 06a of the inner link plate 06 and when the non-guide row 05 starts to engage with the driving sprocket 08, there is a case when the guide plate 03 contacts with the sprocket tooth 09 before the inner link plate 06 contacts with the sprocket tooth 09.

Even though the sprocket teeth are originally designed to start to contact and engage with the middle link plates and inner link plates without contacting the guide plates when the silent chain starts to engage with the sprocket to reduce noise of the chain, the silent chain causes noise due to the contact of the guide plates with the sprocket teeth and drops noise performance of the silent chain transmission system if the sprocket teeth contact with the guide plates prior to the middle and inner link plates.

Accordingly, the present invention aims at solving the aforementioned prior art problems by providing a silent chain transmission system whose noise performance is improved by preventing guide plates of a silent chain from contacting with sprocket teeth prior to link plates.

The invention also aims at realizing the abovementioned object with a simple structure by arranging a shape of the guide plate.

Means for Solving the Problems

In order to solve the aforementioned problems, according to a first aspect of the invention, there is provided a silent chain transmission system comprising silent chain (2) movable in a direction of chain travel, said chain having guide rows (3) each having a pair of guide plates (10) and middle link plates (30) disposed between said guide plates (10), non-guide rows (4) each having a plurality of link plates (40), each of said middle link plates having pairs of teeth including a first tooth having an inner tooth-engaging flank for engaging a sprocket tooth as said chain comes into engagement with a sprocket, and pairs of link pins (5) each held by said pair of guide plates (10), said link pins being separated from each other in said direction of chain travel, wherein the guide rows (3) and said non-guide rows (4) are alternately interleaved in said direction of chain travel and linked by said link pins, said silent chain transmission also including sprockets (7) having a plurality of sprocket teeth with which said silent chain is engaged, wherein said inner tooth-engaging flank (34) in at least one of the middle link plates (10) in each guide row (4) is disposed sufficiently rearward with respect to said direction of chain travel in relation to the guide plates (10) in the same guide row that said inner tooth-engaging flank (34) begins to come into contact with a sprocket tooth (8a) of one of said sprockets (7) at an engagement starting point (P3) before a guide plate in the same guide row can come into contact with said sprocket tooth (8a) when the chain (2) is in a transverse run-out state, i.e., it has moved to a limit in a direction transverse to said direction of chain travel due to engagement of a guide plate of the chain with said one of the sprockets.

According to a second aspect of the invention, the guide plate (10) has a shape of avoiding the guide plate (10) from contacting with the sprocket tooth (8) before one of the link plates (30, 40) starts to engage with the sprocket tooth (8) in the transverse-runout state.

According to a third aspect of the invention, when one of the link plates (30, 40) is the middle link plate (30), the guide plate (10) has a shape of avoiding the guide plate (10) from contacting with the sprocket tooth (8) before an inner-flank surface (34, 35) of the middle link plate (30) starts to engage with the sprocket tooth (8) in the transverse-runout state.

According to a fourth aspect of the invention, when one of the link plates (30, 40) is the inner link plate (40), the guide plate (10) has a shape of avoiding the guide plate (10) from contacting with the sprocket tooth (8) before an inner-flank surface (44, 45) of the inner link plate (40) starts to engage with the sprocket tooth (8) in the transverse-runout state.

According to a fifth aspect of the invention, the guide plate (10) has a shape of avoiding the guide plate (10) from contacting with the sprocket tooth (8) during a period from when the inner-flank surface (44, 45) of the inner link plate (40) starts to engage with the sprocket tooth (8) until when an outer-flank surface (36, 37) of the middle link plate (30) seats on the sprocket (7) in the transverse-runout state.

Advantageous Effects of the Invention

According to the invention described in claim 1, because the engagement starting point of one of the link plates of the silent chain with the sprocket tooth is set at the position of avoiding the guide plate from contacting with the sprocket tooth before one of the link plates starts to engage with the sprocket tooth when the silent chain is in a transverse-runout state, it is possible to prevent the sprocket tooth from contacting with the guide plate until when the flank surface of one of the link plates starts to engage with the sprocket tooth when the traveling silent chain starts to engage with the sprocket tooth in the transverse-runout state.

As a result, it is possible to prevent the guide plate 10 from contacting with the sprocket tooth 8 even when the silent chain 2 is in the transverse-runout state before and after when the silent chain 2 starts to engage with the sprocket tooth 8. Then, it becomes possible to keep the original engagement starting configuration of the sprocket tooth 8 that conforms to such a design concept that the respective link plates 30 and 40 of the silent chain 2 contact first with the sprocket tooth 8 in the same manner when the silent chain 2 travels on the normal position and to improve the noise performance of the silent chain transmission system 1 because it becomes possible to prevent the noise otherwise caused by the contact of the guide plate 10 with the sprocket tooth 8 before starting the engagement.

According to the second aspect of the invention, the following effect is brought about in addition to the effects of the invention described in claim 1.

That is, it is possible to realize the setting of the engagement starting point of one of the link plates with the sprocket tooth at the position of avoiding the guide plate from contacting with the sprocket tooth before one of the link plates starts to engage with the sprocket tooth in the transverse-runout state by the simple structure by using the guide plate having the shape of avoiding the guide plate from contacting with the sprocket tooth before one of link plates starts to engage with the sprocket tooth.

According to the third aspect of the invention, the following effect is brought about in addition to the effects of the invention described in claim 1.

That is, it is possible to realize the setting of the engagement starting point of inner-flank surface of the middle link plate with the sprocket tooth at the position of avoiding the guide plate from contacting with the sprocket tooth before the inner-flank surface starts to engage with the sprocket tooth in the transverse-runout state by a simple structure by using the guide plate having the shape of avoiding the guide plate from contacting with the sprocket tooth before the inner-flank surface starts to engage with the sprocket tooth.

According to the fourth aspect of the invention, the following effect is brought about in addition to the effects of the invention described in claim 1.

That is, it is possible to realize the setting of the engagement starting point of inner-flank surface of the inner link plate with the sprocket tooth at the position of avoiding the guide plate from contacting with the sprocket tooth before the inner-flank surface starts to engage with the sprocket tooth in the transverse-runout state by the simple structure by using the guide plate having the shape of avoiding the guide plate from contacting with the sprocket tooth before the inner-flank surface starts to engage with the sprocket tooth.

According to the fifth aspect of the invention, the following effect is brought about in addition to the effect of the fourth aspect of the invention.

That is, the guide plate does not contact with the sprocket tooth even after when the inner-flank surface of the inner link plate starts to engage with the sprocket tooth until when the outer-flank surface of the middle link plate seats on the sprocket in the transverse-runout state in the same manner with the start of engagement of the inner-flank surface of the inner link plate and the sprocket tooth. As a result, because it becomes possible to prevent noise otherwise caused by the contact of the guide plate with the sprocket tooth, it is possible to improve the noise performance of the silent chain transmission system further.

Still more, it is possible to realize the non-contact state of the guide plate 10 and the sprocket tooth 8 during the period after when the inner link plate starts to engage with the sprocket 7 until when the middle link plate 30 seats on the sprocket 7 by the simple structure by using the guide plate 10 having the shape of avoiding the guide plate 10 from contacting with the sprocket tooth 8 during the period after when the inner link plate 40 starts to engage with the sprocket 7 until when the middle link plate 30 seats on the sprocket 7.

BRIEF DESCRIPTION OF DRAWINGS

FIG. 3 is a diagram around a guide row of the silent chain in the silent chain transmission system shown in FIG. 1, wherein

PREFERRED EMBODIMENT OF THE INVENTION

The specific mode of a silent chain transmission system of the present invention may take any configuration as long as the silent chain transmission system comprises a silent chain having guide rows each having a pair of guide plates and middle link plates disposed between the pair of guide plates, non-guide rows each having a plurality of inner link plates and pairs of link pins each held by the pair of guide plates by being separated in a chain traveling direction, wherein the guide rows and the non-guide rows being alternately in mesh in the chain traveling direction by being linked by the pair of link plates, and sprockets having sprocket teeth with which the silent chain is engageable, wherein an engagement starting point of at least one of link plates of the middle link plate and the inner link plate with the sprocket tooth is set at position of avoiding the guide plate from contacting with the sprocket tooth before one of the link plates starts to engage with the sprocket tooth when the silent chain is in a transverse-runout state, and which prevents the guide plate of the silent chain from contacting with the sprocket tooth prior to the link plates and improves noise performance of the silent chain transmission system.

For instance, the sprocket tooth may be formed into a shape of avoiding the guide plate from contacting with the sprocket tooth before one of the link plates starts to engage with the sprocket tooth, beside the shape of the guide plate, in order to set the engagement starting point of one of the link plates with the sprocket tooth at position of avoiding the guide plate from contacting with the sprocket tooth before one of the link plates starts to engage with the sprocket tooth.

Still more, the silent chain may be an outer flank engaging and outer flank seating type silent chain or an inner flank engaging and inner flank seating type silent chain for example other than the inner flank engaging and outer flank seating type silent chain.

The silent chain may be also either an endless chain or a reciprocating end-cut chain.

The sprocket may be either a driving sprocket or a driven sprocket.

[Embodiment]

An embodiment of the invention will be explained below with reference to FIGS. 1 through 4.

Figure 1:
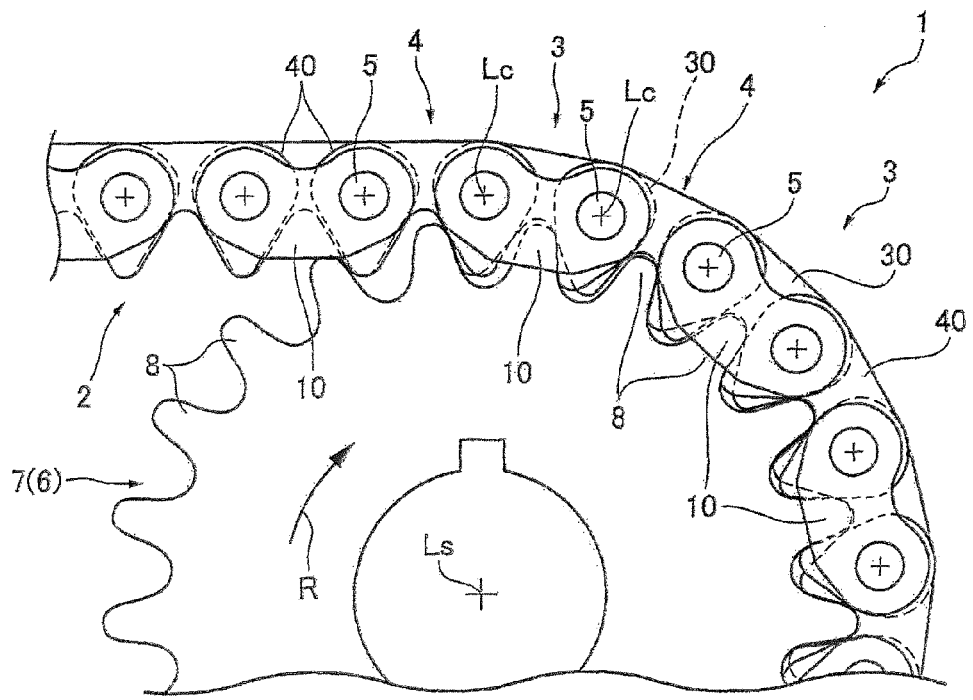
FIG. 1 is a side view showing a main part of a silent chain transmission system of an embodiment of the invention.
Figure 2:
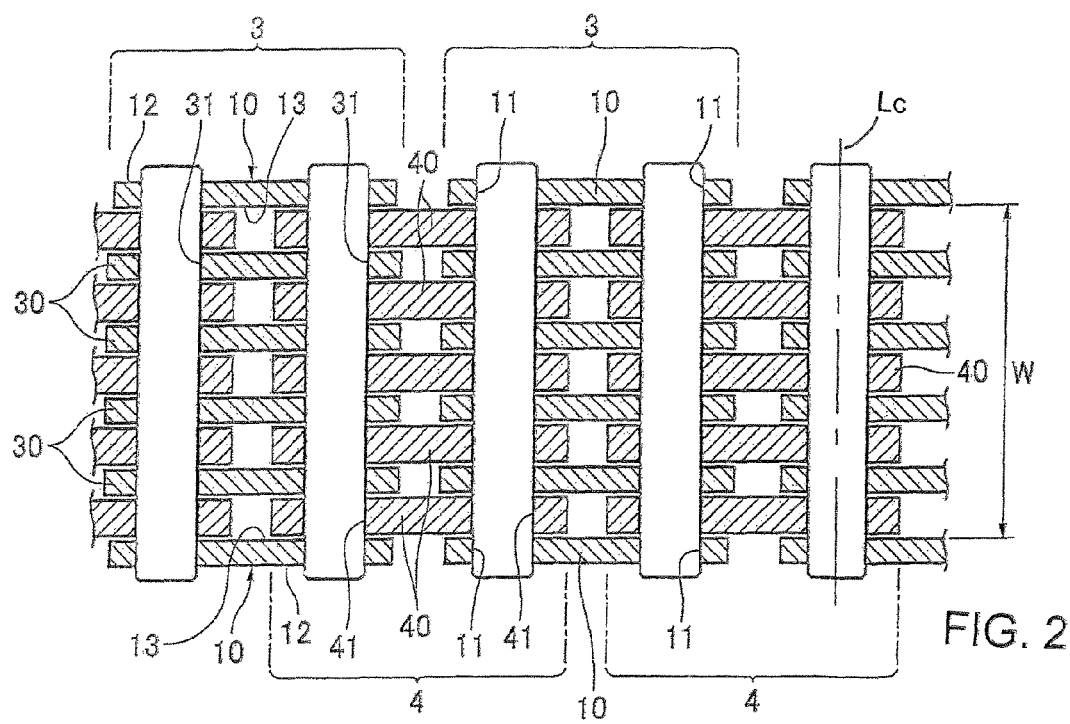
FIG. 2 is a section view of the main part taken at a plane including a center line of rotation and along a chain traveling direction of a silent chain in the silent chain transmission system in FIG. 1.
Figure 3A:
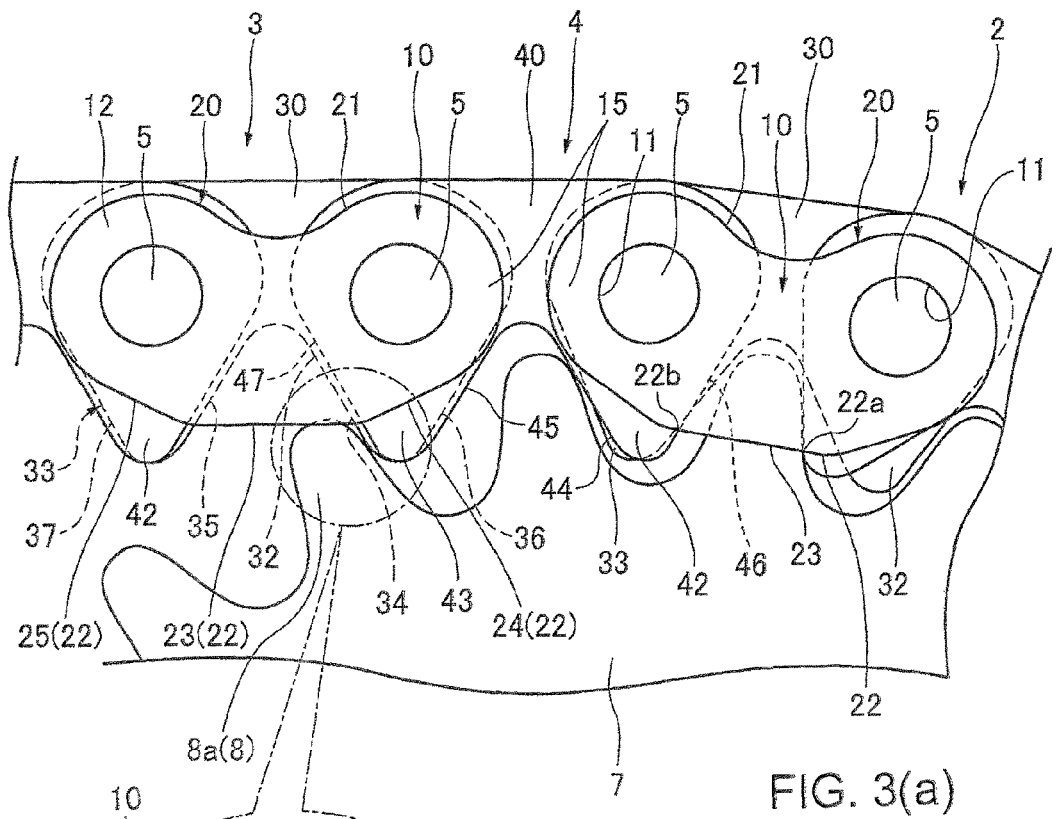
FIG. 3(a) is an enlarged side view of the main part and FIG. 3(b) is a section view taken along arrows b-b in FIG. 3(a).
Figure 3B:
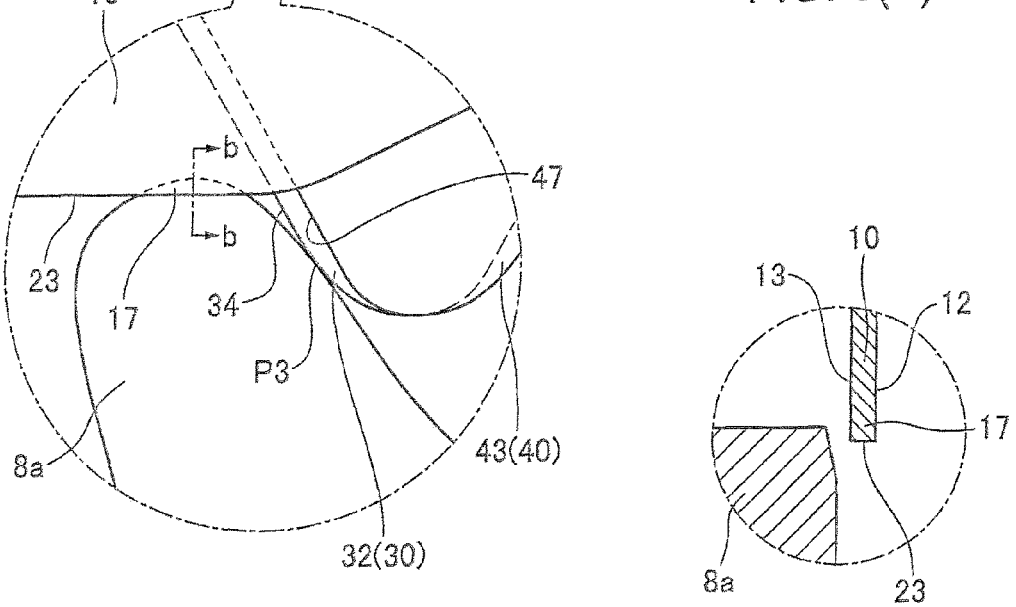
Figure 4:
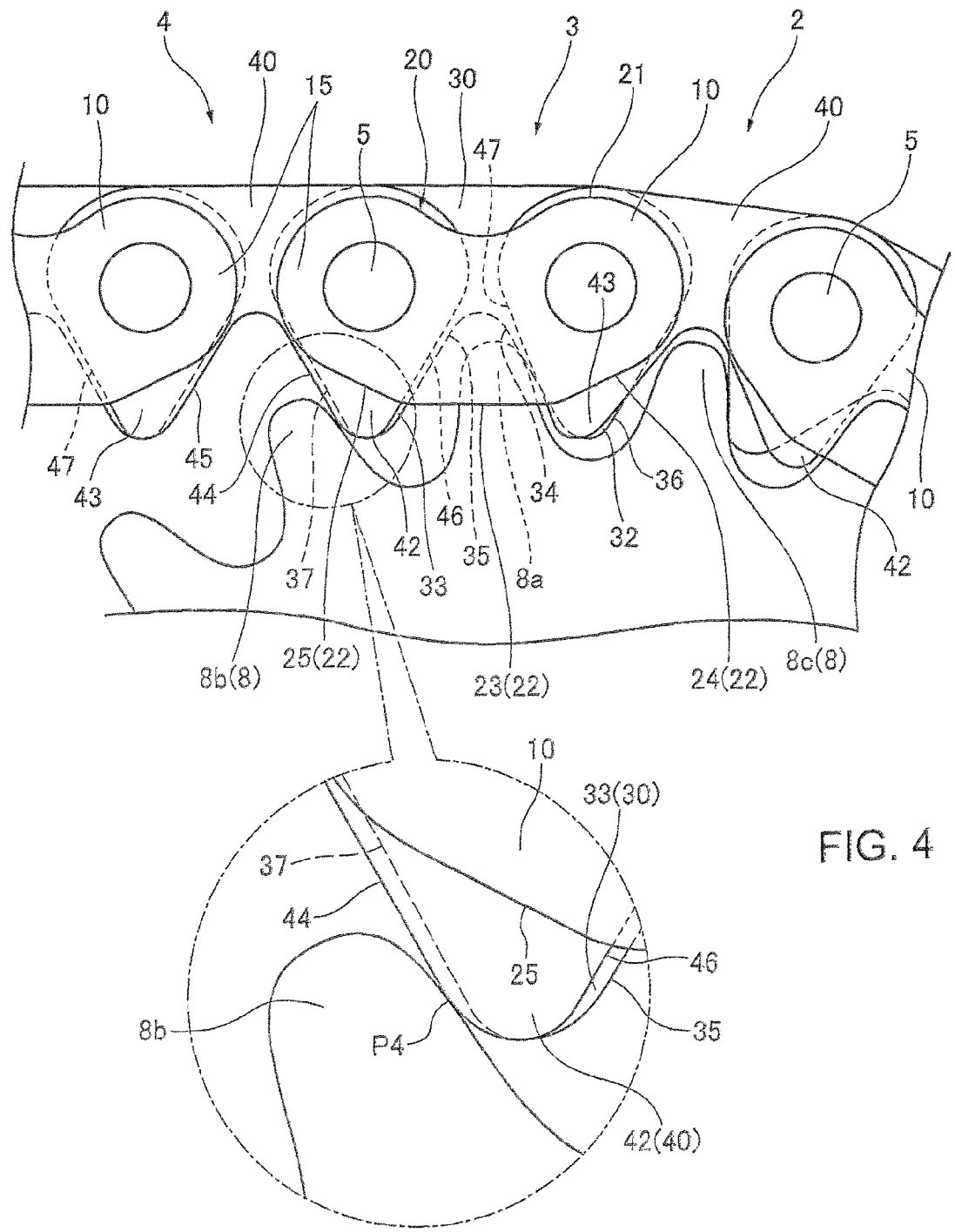
FIG. 4 is an enlarged side view of the main part around a non-guide row of the silent chain in the silent chain transmission system in FIG. 1.

Here, FIG. 1 is a side view showing a main part of a silent chain transmission system 1 of an embodiment of the invention, FIG. 2 is a section view showing the main part of the silent chain transmission system 1 in FIG. 1, FIG. 3 is a diagram around a guide row 3 of a silent chain 2, wherein FIG. 3(a) is an enlarged side view of the main part and FIG. 3(b) is a section view taken along arrows b-b in FIG. 3(a) and FIG. 4 is an enlarged side view of the main part around a non-guide row 4 of the silent chain 2.

As shown in FIGS. 1 and 2, the silent chain transmission system 1 comprises the silent chain 2 in which a plurality of guide rows 3 and a plurality of non-guide rows 4 are alternately in mesh in a chain traveling direction by being flexibly linked by a plurality of link pins 5 and a sprocket structure 6 having one or more sprockets around which the silent chain 2 is wrapped.

The sprocket has a plurality of sprocket teeth with which the silent chain 2 is engageable.

The silent chain 2 is an endless chain in which the guide rows 3 and the non-guide rows 4 are endlessly linked by the link pins 5 in the present embodiment.

The sprocket structure 6 is composed of a plurality of sprockets, i.e., more specifically, one or more driving sprockets and one or more driven sprockets, in the present embodiment.

As one example of the sprocket, FIG. 1 shows a sprocket 7 which is a driving sprocket having a plurality of sprocket teeth 8 and which rotates in a rotational direction R centering on a center line of rotation Ls.

Here, the chain traveling direction is a direction in which the silent chain 2 engaging with the sprocket 7 moves and a chain width direction is a direction in parallel with a center line of flexion Lc of the guide and non-guide rows 3 and 4 or with the center line of rotation Ls of the sprocket 7 specified by the link pins 5. A center line of flexion Lc is shown endwise in FIG. 1 and in plan in FIG. 2. Front and rear directions refer to forward and rearward directions of the chain traveling direction.

A side view refers to viewing from a direction in parallel with the center line of rotation Ls and a radial direction is a radial direction centering on the center line of rotation Ls of the sprocket 7.

Still more, a transverse-runout state of the silent chain 2 means a state in which the traveling silent chain 2 runs out in the chain width direction.

The silent chain 2 has the guide rows 3 each having a pair of guide plates 10 and one or more or a first predetermined number of, i.e., four middle link plates 30 here, the non-guide rows 4 each having one or more or a second predetermined number greater than the first predetermined number by one, i.e., five inner link plates 40 here, and pairs of link pins 5 each held by the pair of guide plates 10 per one guide row 3, separated in the chain traveling direction and rotably link the middle link plates 30 and the inner link plates 40.

In each guide row 3, the plurality of middle link plates 30 is disposed between the pair of guide plates 10 in the chain width direction. Each guide plate 10 is provided with pin holding holes 11 as a pair of holing portions for holding the pair of link pins 5 at positions separated in the chain traveling direction (or in the front-rear direction).

Both ends in the chain traveling direction of each pin 5 are fixed to the guide plates 10 by fixing means, e.g., press-fitting or caulking, while being inserted into the pin holding holes 11.

In each non-guide row 4, the plurality of inner link plates 40 is disposed between the pair of guide plates 10 in the chain width direction while straddling over the guide rows 3 neighboring in the chain traveling direction.

Then, the first predetermined number of middle link plates 30 and the second predetermined number of inner link plates 40 are disposed while being alternately layered in the chain width direction between the pair of guide plates 10.

Each of the middle link plates 30 and each of the inner link plates 40 have a pair of link teeth 32 and 33 and 42 and 43, respectively, that project inwardly in the radial direction and that engage or contact with the sprocket tooth 8 as shown also in FIGS. 3 and 4.

The pair of link teeth 32 and 33 is composed of a front link tooth 32 on the front side and a rear link tooth 33 on the rear side in terms of the chain traveling direction and the pair of link teeth 42 and 43 is composed of a front link tooth 42 on the front side and a rear link tooth 43 on the rear side in terms of the chain traveling direction.

The respective link teeth 32 and 33 have inner-flank surfaces 34 and 35, contactable with the sprocket teeth 8, and outer-flank surfaces 36 and 37 and the respective link teeth 42 and 43 have inner-flank surfaces and 45, contactable with the sprocket teeth 8, and outer-flank surfaces 46 and 47.

The pairs of the inner-flank surface 34 and 35 and 44 and 45 of the respective link plates 30 and 40 are composed of the front inner-flank surfaces 34 and 44 on the front side and the rear inner-flank surfaces 35 and on the rear side in terms of the chain traveling direction. Similarly, the pairs of the outer-flank surface 36 and 37 and 46 and 47 are composed of the front outer-flank surfaces 36 and 46 on the front side and the rear outer-flank surfaces 37 and 47 on the rear side in terms of the chain traveling direction.

The middle and inner link plates 30 and 40 are provided with pin inserting holes 31 and 41 (see FIG. 2) through which the link pins 5 are inserted respectively at positions separated in the chain traveling direction.

The pair of link pins 5 held by the pair of guide plates 10 in each guide row 3 links a group of link plates composed of the middle and inner link plates 30 and 40 while penetrating through the pin inserting holes 31 and 41 between the pair of guide plates 10.

The middle and inner link plates 30 and 40 are turnable or flexible centering on the center line of rotation which is also the center line of flexion Lc specified by the link pin 5 while being linked by the link pins 5.

While the link pin 5 is a single round pin in the present embodiment, it may be a rocker pin having a plurality of pins.

Figure 5:
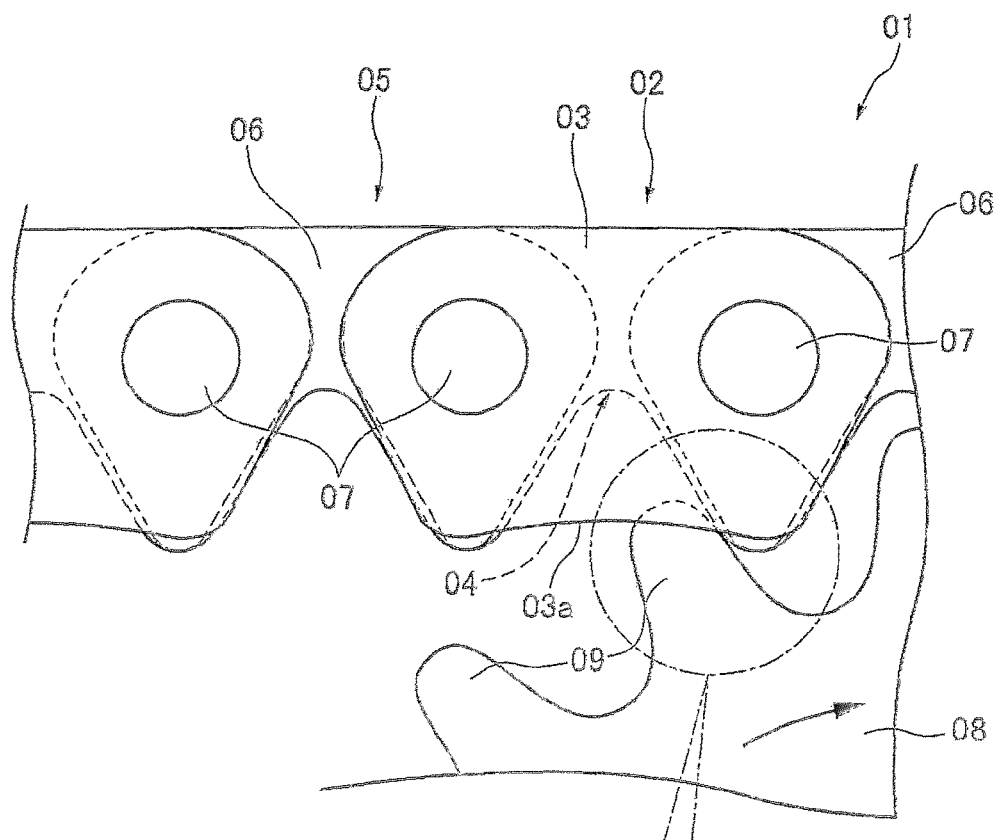
FIG. 5 is an enlarged side view of a main part around a guide row of a silent chain in a prior art silent chain transmission system.
Figure 5:
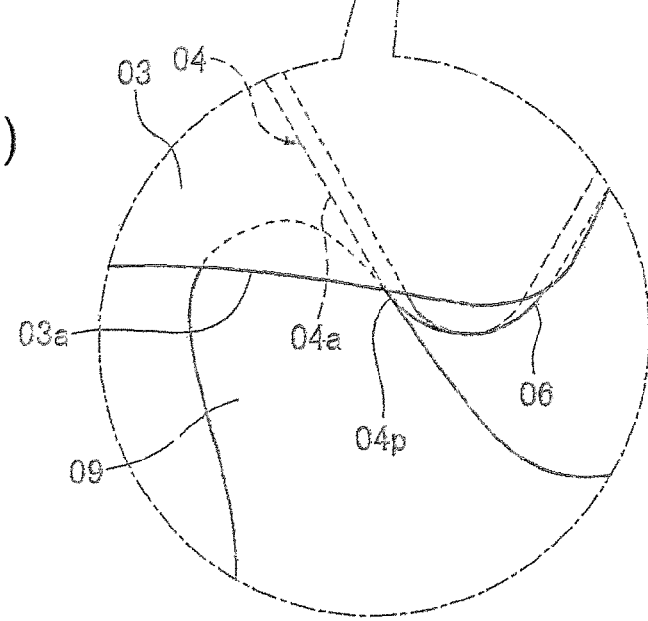
Figure 6:
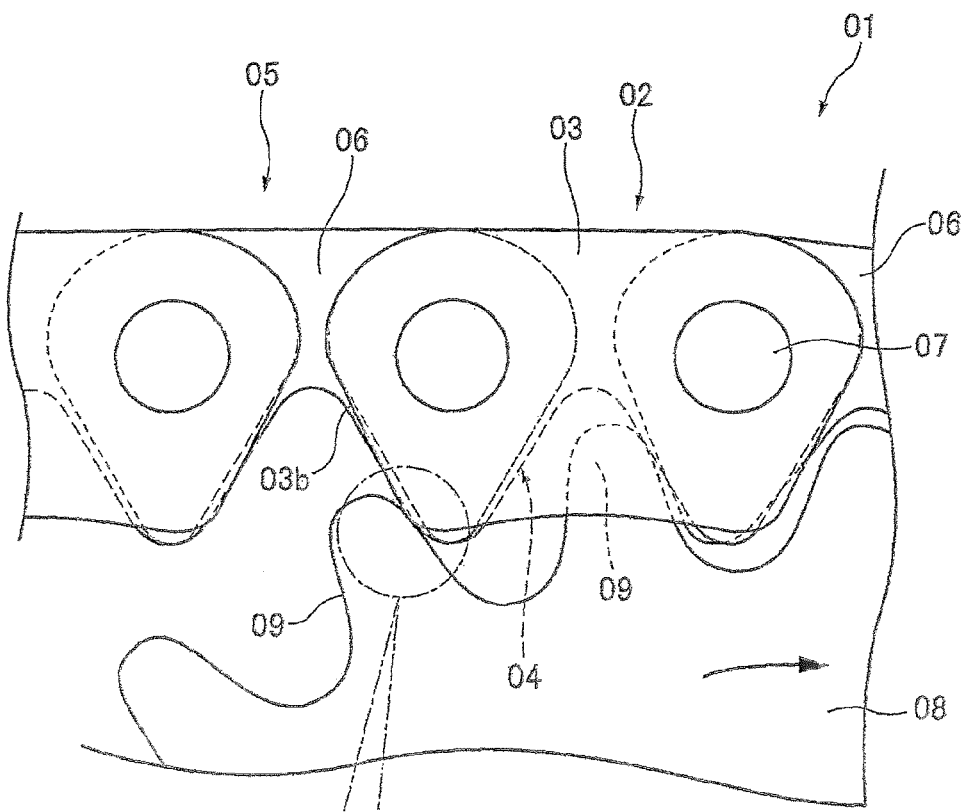
FIG. 6 is an enlarged side view of a main part around a non-guide row of the silent chain in the silent chain transmission system in FIG. 5.
Figure 6:
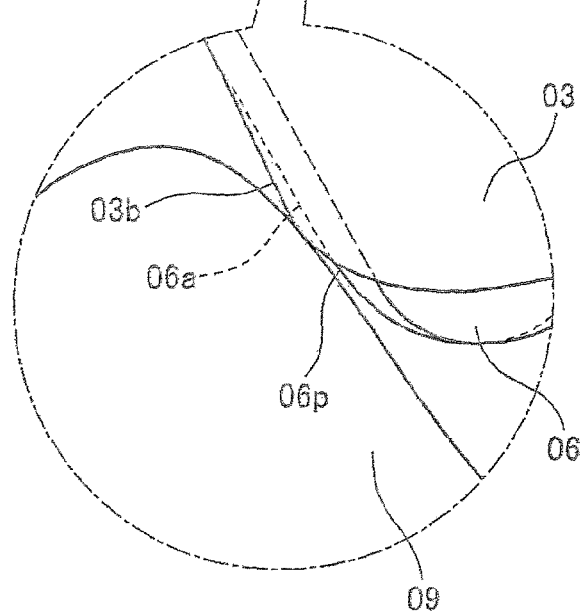

When the guide rows 3 and non-guide rows 4 engage with the sprocket teeth 8 when the silent chain 2 travels at normal position (referred to as 'normal position' hereinafter) as shown in FIGS. 4 and 5, the engagement starts as the front inner-flank surfaces 34 and 44 of the respective link plates 30 and 40 contact with the sprocket teeth 8. Then, in a process in which engagement starting points move inwardly in the radial direction along the sprocket tooth 8 with the advance of this engagement, the engagement starting points on the respective link plates 30 and 40 shift from the inner-flank surfaces 34 and 44 to the respective pairs of outer-flank surfaces 36 and 37 and 46 and 47. When the engagement ends, the both outer-flank surface 36 and 37 and 46 and 47 of the respective link plates 30 and 40 contact with the sprocket teeth 8 and the middle link plates 30 seat on the sprocket 7. Accordingly, the silent chain 2 is a so-called inner-flank engaging and outer-flank seating type chain.

Here, the normal position is a position when the sprocket tooth 8 is located within a distance W in the chain width direction (see FIG. 2) between the pair of guide plates 10 per guide row 3. In other words, it is a position in which the guide plates 10 and the sprocket tooth 8 are not located at the same position in the chain width direction, i.e., do not overlap at the position in the chain width direction.

When the silent chain 2 is in the transverse-runout state, it means that the silent chain 2 moves relatively in the chain width direction from the normal position and is not located at the normal position.

Therefore, when the silent chain 2 is in the transverse-runout state, the silent chain 2 moves relatively in the chain width direction from the normal position and the guide plates 10 are not located within the distance W, i.e., are in a state of moving relatively in the width direction.

It is noted that FIGS. 1 through 4 illustrate the silent chain 2 located at the normal position.

As shown in FIG. 2, each guide plate 10 has an outer side surface 12 and an inner side surface 13 (see also FIG. 3) which are side surfaces in the chain width direction.

Still more, as shown in FIGS. 3(*a*) and 4, an outline face 20 of the guide plate 10 in the side view can be divided into an inner outline face 22 on the side where the sprocket tooth 8 is located (i.e., radially inside) and an outer outline face 21 on the side opposite from the inner outline face 22 (i.e., radially outside) by a border of a maximum width portion 15 having a maximum width in the chain traveling direction in the guide plate 10. Then, the inner outline face 22 has an inner end surface 23 having a portion located most inwardly in the radial direction within the inner outline face 22 and a pair of inner side end surfaces 24 and 25 from the inner end surface 23 to the maximum width portion 15.

In the side view, the inner end surface 23 is a portion where intersecting portions 22*a* and 22*b* of the inner outline face 22 and the pair of inner-flank surfaces 44 and 45 of the middle link plate 30 or vicinities of the intersecting portions 22*a* and 22*b* become both end portions thereof in the chain traveling direction, and is located inwardly in the radial direction more than the pair of inner side end surfaces 24 and 25.

The pair of inner side end surfaces 24 and 25 is, in terms of the chain traveling direction, the front inner side end surface 24 on the front side and the rear inner side end surface 25 on the rear side.

Then, when the silent chain 2 is driven by the sprocket 7 and is traveling in the transverse-runout state, the engagement starting points P3 and P4 of the respective front inner-flank surfaces 34 and 44 of the middle and inner link plates 30 and 40 with the sprocket tooth 8 are set at positions of avoiding the guide plate from contacting with the sprocket tooth 8 before the front inner-flank surfaces 34 and 44 of the respective link plates 30 and 40 starts to engage with the sprocket tooth 8, i.e., at position where they do not contact before the front inner-flank surfaces 34 and 44 of the respective link plates 30 and 40 start to engage with the sprocket tooth 8, similarly to the case when the silent chain 2 is located at the normal position.

Due to that, when the middle and inner link plates 30 and 40 starts to engage with the sprocket tooth 8, the middle and inner link plates 30 and 40 contact with the sprocket tooth 8 always prior to the guide plates 10.

Then, the guide plate 10 is formed into such a shape that the engagement starting points 23 and 24 are located at the positions of avoiding the guide plate 10 from contacting with the sprocket 7 before the respective link plates 30 and 40 start to engage with the sprocket tooth 8, i.e., at the positions where the guide plates 10 do not contact with the sprocket 7 before the respective link plates 30 and 40 start to engage with the sprocket tooth 8.

Specifically, when the middle link plate 30 starts to engage with the sprocket tooth 8 as shown in FIG. 3(*a*), the guide plate 10 has a shape of avoiding the inner end surface 23 and the both inner side end surfaces 24 and 25 from contacting with the sprocket tooth 8*a* before the front inner-flank surface 34 of the middle link plate 30 starts to engage with the sprocket tooth 8*a* in the transverse-runout state.

Due to that, the inner outline face 22 is located outwardly in the radial direction more than the engagement starting point P3 in the whole thereof including the inner end surface 23 before the front inner-flank surface 34 starts to engage with the sprocket 7.

Then, when the guide plate 10 has an overlap portion 17 overlapping with the sprocket tooth 8 in the side view as shown in FIG. 3(*a*), the shape of the inner end surface 23 is set so that the sprocket tooth 8 is located within the distance W by the overlap portion 17 even when the chain is in the transverse-runout state in order to avoid the inner end surface 23 from contacting with the sprocket tooth 8*a* before the front inner-flank surface 34 starts to engage with the sprocket tooth 8*a* (see FIG. 3(*b*)).

It is noted that as another example, the guide plate 10 may be formed into a shape so that the entire guide plate 10 does not overlap with the sprocket tooth 8 in the side view before the middle link plate 30 starts to engage with the sprocket tooth 8.

Still more, as shown in FIG. 4, the guide plate 10 may be formed into a shape of avoiding the inner end surface 23 and the both inner side end surfaces 24 and 25 from contacting with the sprocket tooth 8 before the front inner-flank surface 44 of the inner link plate 40 starts to engage with the sprocket tooth 8 in the transverse-runout state when the inner link plate 40 of the non-guide row 4 starts to engage with the sprocket tooth 8.

Due to that, the whole of the inner outline face 22 including the rear inner side end surface 25 is located outwardly in the radial direction more than the engagement starting point P4 and the entire guide plate 10 does not overlap with the sprocket tooth 8 in the side view (i.e., the entire guide plate 10 is located radially outside of the sprocket tooth 8) before the inner-flank surface 44 starts to engage with the sprocket tooth 8.

Furthermore, the guide plate 10 is formed into a shape of avoiding the inner outline face 22 of the guide plate 10 from contacting with the sprocket tooth 8*b* during a period from when the inner-flank surface 44 of the inner link plate 40 starts to engage with the sprocket tooth 8*b* as the engagement of the inner link plate 40 with the sprocket tooth 8 advances until when the both outer-flank surfaces 36 and 37 of the middle link plate 30 located on the front side of, i.e., preceding to, the inner link plate 40 contact respectively with the sprocket tooth 8*c* and 8*b* located on the front side of the sprocket tooth 8*a* and seat on the sprocket 7. That is, the guide plate 10 has a shape so that the guide plate 10 does not overlap with the sprocket tooth 8 in the side view.

Therefore, the rear inner side end surface 25 is formed into the shape of avoiding the rear inner side end surface 25 from contacting with the sprocket tooth 8 during the period from when the inner link plate 40 starts to engage with the sprocket tooth 8 until when the middle link plate 30 located on the front side of the inner link plate 40 seats on the sprocket 7 or into the shape so that the rear inner side end surface 25 does not overlap with the sprocket tooth 8 in the side view.

Then, due to the positions of the engagement starting points P3 and P4 described above and to the shape of the guide plate 10 with respect to the sprocket tooth 8 described above, it becomes possible to prevent the guide plate 10 from contacting with the sprocket tooth 8 before the middle and inner link plates 30 and 40 even when the traveling silent chain 2 is in the transverse-runout state during when the silent chain transmission system 1 is operative.

Next, operations and effects of the embodiment configured as described above will be explained.

In the silent chain transmission system 1 having the silent chain 2 and the sprocket 7 engaging with the silent chain 2, the engagement starting points P3 and P4 of the middle and inner link plates 30 and 40 with the sprocket tooth 8 are set at the positions of avoiding the guide plate 10 from contacting with the sprocket tooth 8 before the link plates 30 and 40 starts to engage with the sprocket tooth 8 when the silent chain 2 is in the transverse-runout state as described above.

With this arrangement, because the engagement starting points P3 and P4 of the middle and inner link plates 30 and 40 with the sprocket tooth 8 are located at the positions of avoiding the guide plates 10 from contacting with the sprocket tooth 8 before the link plates 30 and 40 starts to engage with the sprocket tooth when the silent chain 2 is in the transverse-runout state, it becomes possible to prevent the sprocket teeth 8*a* and 8*b* from contacting with the guide plate 10 until when the sprocket teeth start to engage with the inner-flank surfaces 34 and 44 of the respective link plates 30 and 40 when the traveling silent chain 2 starts to engage with the sprocket teeth 8*a* and 8*b* in the transverse-runout state.

As a result, it is possible to prevent the guide plate 10 from contacting with the sprocket tooth 8 even when the silent chain 2 is in the transverse-runout state before and after when the silent chain 2 starts to engage with the sprocket tooth 8. Then, it becomes possible to keep the original engagement starting configuration of the sprocket tooth 8 that conforms to such a design concept that the respective link plates 30 and 40 of the silent chain 2 contact first with the sprocket tooth 8 in the same manner when the silent chain 2 travels on the normal position and to improve the noise performance of the silent chain transmission system 1 because it becomes possible to prevent the noise otherwise caused by the contact of the guide plate 10 with the sprocket tooth 8 before starting the engagement.

The guide plate 10 is formed into the shape of avoiding the guide plate 10 from contacting with the sprocket tooth 8 before the inner-flank surface 34 of the middle link plate 30 starts to engage with the sprocket tooth 8 and before the inner-flank surface 44 of the inner link plate 40 starts to engage with the sprocket tooth 8 in the transverse-runout state.

With this arrangement, it becomes possible to realize the setting of the engagement starting point P3 of the inner-flank surface 34 of the middle link plate 30 with the sprocket tooth 8 and the engagement starting point P4 of the inner-flank surface 44 of the inner link plate 40 with the sprocket tooth 8 at the positions of avoiding the guide plate 10 from contacting with the sprocket tooth 8 before the respective inner-flank surfaces 34 and 44 starts to engage with the sprocket tooth 8 when the silent chain 2 is in the transverse-runout state with the simple structure by using the guide plate 10 having the shape of avoiding the guide plate 10 from contacting with the sprocket tooth 8 before the respective inner-flank surfaces 34 and 44 starts to engage with the sprocket tooth 8.

The abovementioned effect is also brought about when the guide plate 10 is formed into the shape so that the guide plate 10 does not overlap with the sprocket tooth 8 in the side view before the inner-flank surface 34 of the middle link plate 30 starts to engage with the sprocket tooth 8 in the transverse-runout state and so that the guide plate 10 does not overlap with the sprocket tooth 8 in the side view before the inner-flank surface 44 of the inner link plate 40 starts to engage with the sprocket tooth 8.

The guide plate 10 is also formed into the shape of avoiding the guide plate 10 from contacting with the sprocket tooth 8 during the period from when the inner-flank surface 44 of the inner link plate 40 starts to engage with the sprocket tooth 8*b* until when the both outer-flank surfaces 36 and 37 of the middle link plate 30 seat on the sprocket 7 when the silent chain 2 is in the transverse-runout state.

With this arrangement, in the inner flank engaging and outer flank seating type silent chain 2, the guide plate 10 does not contact with the sprocket tooth 8 until when the middle link plate 30 seats on the sprocket 7 even after when the inner-flank surface 44 of the inner link plate 40 starts to engage with the sprocket tooth 8*b* in the same manner with the case when the inner-flank surface 44 of the inner link plate 40 starts to engage with the sprocket tooth 8*b*. As a result, because it is possible to prevent the noise otherwise caused by the contact of the guide plate 10 with the sprocket tooth 8 even after when the inner link plate 40 starts to engage with the sprocket tooth 8, it is possible to improve the noise performance of the silent chain transmission system 1 further.

Still more, it is possible to realize the non-contact state of the guide plate 10 and the sprocket tooth 8 during the period after when the inner link plate starts to engage with the sprocket 7 until when the middle link plate 30 seats on the sprocket 7 by the simple structure by using the guide plate 10 having the shape of avoiding the guide plate 10 from contacting with the sprocket tooth 8 during the period after when the inner link plate 40 starts to engage with the sprocket 7 until when the middle link plate 30 seats on the sprocket 7.

Furthermore, because the entire inner outline face 22 is located outwardly in the radial direction more than the engagement starting points P3 and P4, it becomes possible to downsize the guide plate 10 in the radial direction and to lighten the guide plate 10. Still more, because the guide plate 10 has the shape of avoiding the rear inner side end surface 25 of the guide plate 10 from contacting with the sprocket tooth 8 during the period after when the inner link plate 40 starts to engage with the sprocket 7 until when the middle link plate 30 seats on the sprocket 7, it becomes possible to downsize the guide plate 10 in the radial direction further.

An example in which part of the abovementioned embodiment is modified will be explained below centering on the modified part.

That is, the engagement starting point P3 or the engagement starting point P4 of one of link plates of the middle and inner link plates 30 and 40 may be set positions of avoiding the guide plate 10 from contacting with the sprocket tooth 8 before one of the link plates starts to engage with the sprocket tooth 8 when the silent chain 2 is in the transverse-runout state. It is possible to reduce the noise otherwise caused by the contact of the guide plate 10 with the sprocket tooth 8 as compared to the technology of contacting the guide plate with the sprocket tooth before the middle link plate and inner link plate starts to engage with the sprocket tooth when the silent chain is in the transverse-runout state also in this case.

It is noted that in a case when the sprocket 7 is a driven sprocket, the engagement starting points P3 and P4 are located on the rear inner-flank surfaces 35 and 45.

DESCRIPTION OF REFERENCE NUMERALS

1 silent chain transmission system
2 silent chain
3 guide row
4 non-guide row
5 link pin
7 sprocket
8 sprocket tooth
10 guide plate
23 inner end surface
24, 25 inner side end surface
30 middle link plate
34, 35 inner-flank surface
36, 37 outer-flank surface
40 inner link plate
44, 45 inner-flank surface
46, 47 outer-flank surface
P3, P4 engagement starting point

The invention claimed is:

1. A silent chain transmission system comprising a silent chain movable in a direction of chain travel, said chain having guide rows each having a pair of guide plates and middle link plates disposed between said guide plates, non-guide rows each having a plurality of link plates, each of said middle link plates having pairs of teeth including a first tooth having an inner tooth-engaging flank for engaging a sprocket tooth as said chain comes into engagement with a sprocket, and pairs of link pins each held by said pair of guide plates, said link pins being separated from each other in said direction of chain travel, wherein said guide rows and said non-guide rows are alternately interleaved in said direction of chain travel and linked by said link pins, said silent chain transmission also including sprockets having sprocket teeth with which said silent chain is engaged, characterized in that, said inner tooth-engaging flank in at least one of the middle link plates in each guide row is disposed sufficiently rearward with respect to said direction of chain travel in relation to the guide plates in the same guide row that said inner tooth-engaging flank begins to come into contact with a sprocket tooth of one of said sprockets at an engagement starting point before a guide plate in the same guide row can come into contact with said sprocket tooth when the chain has moved to a limit in a direction transverse to said direction of chain travel due to engagement of a guide plate of said chain with said one of said sprockets.

* * * * *